3,338,718
ANIMAL FEEDS CONTAINING MALTOL
William A. Olson, Terre Haute, Ind., assignor to Chas. Pfizer & Co., Inc., New York, N.Y., a corporation of Delaware
No Drawing. Filed Oct. 17, 1963, Ser. No. 317,085
3 Claims. (Cl. 99—2)

This invention relates to new and improved animal feeds and to a method for stimulating the growth of said animals by the use of these feeds. More particularly, it is concerned with certain nutritionally-balanced feeds which also contain maltol as the novel ingredient added thereto.

In the past, it has been reported that various antibiotics, hormones and chemotherapeutic agents are useful for stimulating the growth of domestic animals, such as poultry, lambs, cattle, swine, and the like. Thus, such animals are able to attain market size sooner and on less feed. Furthermore, the incidence of disease is greatly reduced and there are few runts or subpar animals to cull out. Hence, this method has proven to be of sufficient value so that several of these aforementioned growth-promoters are widely used for agricultural purposes. In accordance with the prior art, penicillin and stilbestrol are among the more widely known agents used for stimulating the growth of such animals. However, it has been observed in recent years that the degree of response to these aforementioned growth-promoters is not as favorable now as it once was when much of the work in this field was originally performed.

In accordance with the present invention, it has now been found that when maltol, which is chemically known as 3-hydroxy-2-methyl-$\alpha$-pyrone, is incorporated into such feeds there is obtained a substantially greater growth increase response in animals than when said feeds are used alone, i.e., without the maltol. For these purposes a concentration level as low as five grams per ton of maltol with respect to the animal feed is generally sufficient to impart a substantial growth response to the animal. In general, maltol can be employed in said feeds at concentration levels ranging from about 5 g. up to about 200 g. per ton of said feed in order to achieve the unusually high degree of growth promotion previously referred to. Although some effect may also be produced by using less than 5 g. per ton of feed, the results obtained are often variable and it is usually not advisable to use amounts that are appreciably below the lower limit of the aforesaid range. The preferred proportion is generally one that is in the concentration range of from about 20 to 100 grams per ton of said feed, although this will vary to some extent depending upon the animal's weight, its individual response to said growth promoter and the particular species of animal that is being treated.

As previously indicated, the valuable growth stimulation of the present invention may be achieved by the oral administration of maltol in conjunction with the animal's feed. Such oral administration can also be accomplished in the form of biscuits, tablets, capsules, powders, pellets, solutions, suspensions or on admixture with one or more components of the animal's feed. Alternatively, it may also be administered in an equivalent amount via the animal's drinking water. However, it has usually been found more convenient in practice to administer the maltol in the form of the animal's feed, i.e., on admixture therewith, in order to achieve the outstanding growth response previously referred to. It has also been found that the addition of maltol to the foods which are formulated for domestic animals, i.e., dogs and cats, etc., will cause a preference for these foods by these animals.

The herein described feeds of this invention have been found to be particularly valuable and outstanding in the case of such animals as hogs, swine, lambs, sheep, cattle, and the like. They are also applicable in the case of poultry, domestic pets, as previously indicated, and fur-bearing animals. The maltol may, of course, be administered in one component of the feed, as aforesaid, or it may be uniformly blended or distributed throughout a mixed feed. In this connection, it should also be noted that a wide variety of different feed components may be of use in the nutritional diets of this invention. Types of conventional feed material for domestic agricultural animals and pets generally follow the recommendations of the National Research Council of the National Academy of Sciences in Washington, D.C., as set forth in their series of articles entitled "Nutrient Requirements of Domestic Animals," Nos. 1–11. For instance, feed compositions are recommended to contain roughly between about 50% and about 80% of grains, such as ground grain or grain by-products, molasses and other sugar by-products; between about 3% and about 10% of animal protein, such as fish meal, meat-scraps, and the like; between about 5% and about 30% of vegetable protein, such as soybean oil meal, peanut meal, cottonseed meal, and the like; and between about 2% and about 5% of minerals, such as bone meal, limestone, and trace minerals, together with supplementary vitaminaceous sources, such as thiamine, riboflavin, niacin, etc. Furthermore, the growth-promoter of this invention may either be used alone in said feeds or in conjunction with various antibiotics and other chemotherapeutic agents as well, such as, for example, penicillin, streptomycin, chlortetracycline, oxytetracycline, tetracycline, bacitracin, sulfaquinoxaline, phenylarsonic acid, hydroxyzine, oleandomycin, etc. The feeds may also contain cane sugar or sucrose, preferably at about at least a 7.5% weight concentration level.

In accordance with the results obtained in several of the more specific embodiments of this invention, maltol at levels ranging from about 25 to 200 grams per ton of said feed provided an improved weight gain in swine over the controls at both three and five-week periods of post-weaning. That these results are truly surprising can be evidenced by the fact that monosodium glutamate (MSG), another food flavoring agent and aroma enhancer for humans, does not cause this effect even when administered at much higher concentration levels in the feed (say, e.g., 5–20 lbs./ton) and despite the fact that its rations (i.e. those containing the MSG) are more preferred by the pigs in comparison with similar rations which do not contain the MSG.

This invention is further illustrated by the following examples, which are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

Example 1

Forty-eight (48), 20–24 day old baby pigs were divided into six pens of eight animals each (four male and four female) and fed a standard nutritious diet suitable for early weaned pigs containing approximately 20% crude protein, as well as oxytetracycline at the 200 g. per ton concentration level and also including cane sugar (sucrose) at a level of 7.5% by weight. One group of sixteen (16) such pigs was fed this ration alone and served as the control, while the other two such groups each received this ration together with maltol present in the feed at concentration levels of 25 g. per ton and 200 g. per ton, respectively. All the pigs were individually weighed initially as well as at the end of three and five week periods of feeding (post-weaning). The results obtained in this manner, with respect to animal growth are summarized below in the following table, where the growth index values (percent increases) are given in parentheses:

| Treatment | Average Weight Gains, lbs./pig | |
|---|---|---|
| | 3 weeks | 5 weeks |
| Control | 7.95(100) | 23.44(100) |
| Maltol, 25 g./T | 9.96(125) | 26.52(113) |
| Maltol, 200 g./T | 8.10(102) | 24.01(102) |

As indicated by the data presented in the above table, the growth of pigs was favorably influenced by the addition of maltol to the feeds at the two different concentration levels tested.

*Example II*

The procedure described in Example I was essentially followed except that three replicates of two treatments were used here. One treatment consisted of the basal starter ration containing 7.5% sucrose and served as the control, while the other treatment consisted of exactly the same feed plus maltol at the 25 g. per ton level. Each treatment within each replicate employed eight pigs, four male and four female. Two of the replicates were of the Yorkshire breed and the third was of the Landrace. All the pigs were three weeks old when started, and the replicates were started within one week of each other. The pigs were weighed individually initially, as well as at the end of six and eight weeks of age, respectively. The results obtained in this manner are summarized below in the following table, where the growth index values are given in parentheses:

| Treatment | Average Weight Gain, lbs./pig | |
|---|---|---|
| | 6 weeks | 8 weeks |
| Control | 8.2(100) | 21.6(100) |
| Maltol, 25 g./T | 10.6(129.1) | 25.1(116.2) |

As indicated above in the table, the growth of pigs was again favorably influenced by the addition of maltol, especially when added to the feeds at this particular concentration level.

*Example III*

Black-faced Wether lambs are treated with nutritionally-balanced animal feed compositions containing maltol at the level of 5 grams per ton. The lambs are divided into two groups of twelve animals and each group is replicated twice per treatment. The basal diet employed is presented in the following table:

| | Lbs. |
|---|---|
| Chopped alfalfa hay | 35 |
| Cane molasses | 10 |
| Ground yellow corn | 53 |
| Urea | 1 |
| Bone meal (⅜" pellets) | 1 |

Maltol is then added to the above ration at the level of 5 g./t., as aforesaid, and at the end of sixty days a substantial weight increase is observed in the treated lambs over that afforded by the controls where no maltol is added to the feed. Similar results are also obtained when maltol is added to the feed at the 200 g. per ton level.

*Example IV*

Eight Hereford steers averaging about 500 lbs. in weight per animal are divided into two groups of four steers each. They are then fed a daily diet consisting of three pounds of alfalfa hay together with two pounds of protein supplement and as much ground ear corn as desired. One group received this feed alone, while the other received the feed together with maltol at a concentration level of 20 g. per ton. At the end of a 70-day period, the group receiving the maltol-containing feed has a higher growth index rate than the group receiving the controls (no maltol). Similar results are observed when maltol is employed at the 200 g. per ton concentration level.

What is claimed is:
1. An animal feed composition comprising a nutritionally-balanced animal feed and from about 5 g. up to about 200 g. of maltol per ton of said feed.
2. A process for stimulating growth in animals, which comprises orally administering to an animal in conjunction with its feed an amount of maltol to provide from about 5 g. up to about 200 g. per ton of said feed.
3. A method as claimed in claim 2 wherein the maltol is directly incorporated into the feed.

References Cited

UNITED STATES PATENTS

| Re. 24,707 | 9/1959 | Gillis | 99—2 |
| 2,665,987 | 1/1954 | Baier | 99—2 |
| 2,932,571 | 4/1960 | Tribble | 99—2 |
| 3,156,569 | 11/1964 | Griffin et al. | 99—140 |
| 3,186,853 | 6/1965 | Meusel | 99—159 |

OTHER REFERENCES

Wolf et al., The Antimicrobial Activity of Several Substituted Pyrones, pp. 201–206, Archives of Biochemistry, vols. 27–29.

A. LOUIS MONACELL, *Primary Examiner.*

D. DONOVAN, H. H. KLARE, *Assistant Examiners.*